(12) United States Patent
Shuster

(10) Patent No.: US 8,508,356 B2
(45) Date of Patent: Aug. 13, 2013

(54) SOUND OR RADIATION TRIGGERED LOCATING DEVICE WITH ACTIVITY SENSOR

(76) Inventor: Gary Stephen Shuster, Fresno, CA (US)

(*) Notice: Subject to any disclaimer, the term of this patent is extended or adjusted under 35 U.S.C. 154(b) by 246 days.

(21) Appl. No.: 12/708,190

(22) Filed: Feb. 18, 2010

(65) Prior Publication Data

US 2010/0207781 A1 Aug. 19, 2010

Related U.S. Application Data

(60) Provisional application No. 61/153,550, filed on Feb. 18, 2009.

(51) Int. Cl.
*G08B 19/00* (2006.01)

(52) U.S. Cl.
USPC .................................. 340/522; 340/539.32

(58) Field of Classification Search
USPC ............... 340/539.1–539.32, 571–572.9, 6.1, 340/8.1, 825.49, FOR. 437, 522
See application file for complete search history.

(56) References Cited

U.S. PATENT DOCUMENTS

| | | | |
|---|---|---|---|
| 4,507,653 A * | 3/1985 | Bayer | 340/539.32 |
| 4,975,684 A * | 12/1990 | Guttinger et al. | 340/587 |
| 5,045,839 A * | 9/1991 | Ellis et al. | 340/539.11 |
| 5,204,657 A | 4/1993 | Prosser et al. | |
| 5,349,330 A * | 9/1994 | Diong et al. | 340/567 |
| 5,638,050 A * | 6/1997 | Sacca et al. | 340/571 |
| 5,648,757 A * | 7/1997 | Vernace et al. | 340/539.32 |
| 5,677,675 A * | 10/1997 | Taylor et al. | 340/571 |
| 5,686,887 A | 11/1997 | Chen et al. | |
| 5,705,997 A * | 1/1998 | Park | 340/8.1 |
| 5,790,020 A | 8/1998 | Sasagawa et al. | |
| 5,883,680 A * | 3/1999 | Nykerk | 348/734 |
| 5,926,090 A * | 7/1999 | Taylor et al. | 340/568.1 |
| 5,945,918 A * | 8/1999 | McGonigal et al. | 340/8.1 |
| 6,166,652 A * | 12/2000 | Benvenuti | 340/539.32 |
| 6,198,390 B1 | 3/2001 | Schlager et al. | |
| 6,246,322 B1 * | 6/2001 | LeDain et al. | 340/531 |
| 6,330,457 B1 * | 12/2001 | Yoon | 455/550.1 |
| 6,573,832 B1 | 6/2003 | Fugere-Ramirez | |
| 6,573,833 B1 | 6/2003 | Rosenthal | |
| 6,664,896 B2 | 12/2003 | McDonald et al. | |
| 6,734,795 B2 | 5/2004 | Price | |
| 6,747,555 B2 | 6/2004 | Fellenstein et al. | |
| 6,759,958 B2 * | 7/2004 | Hall | 340/568.1 |
| 6,774,787 B1 | 8/2004 | Melbourne | |
| 6,853,293 B2 * | 2/2005 | Swartz et al. | 340/5.92 |
| 6,911,909 B2 | 6/2005 | Chandar | |

(Continued)

*Primary Examiner* — Steven Lim
*Assistant Examiner* — Stephen Burgdorf
(74) *Attorney, Agent, or Firm* — Novak Druce Connolly Bove + Quigg LLP; Jonathan Jaech

(57) ABSTRACT

A portable device is equipped with a signaling circuit that responds to a searching signal (e.g., hand clap, light flash, RF signal, infrared light) generated to locate the portable device when it is misplaced or lost. The device generates a location signal to enable the user to find the device. The location signal may be an audible, light, vibration, or other signal that calls attention to the device to enable the user to find it. The device may also sense events which cause it to disable the sensor, render it less sensitive, or suppress the generation of the location signal. The sensed event is any event, e.g., heat, motion, which indicates that the device is not, in fact, lost.

12 Claims, 2 Drawing Sheets

(56) References Cited

U.S. PATENT DOCUMENTS

| | | |
|---|---|---|
| 6,943,679 B2 | 9/2005 | Sebanc et al. |
| 7,009,512 B2 * | 3/2006 | Cordoba ................ 340/539.23 |
| 7,009,516 B2 | 3/2006 | Enea |
| 7,151,447 B1 * | 12/2006 | Willms et al. ................ 340/540 |
| 7,170,404 B2 * | 1/2007 | Albert et al. ................ 340/521 |
| 7,446,664 B2 | 11/2008 | White |
| 7,453,357 B2 | 11/2008 | Bernal-Silva et al. |
| 7,492,253 B2 | 2/2009 | Ollis et al. |
| 7,782,194 B2 * | 8/2010 | Stawar et al. ............ 340/539.13 |
| 2001/0000534 A1 * | 4/2001 | Matulich et al. ............ 704/275 |
| 2001/0026219 A1 * | 10/2001 | Sharpe ........................ 340/571 |
| 2002/0021231 A1 * | 2/2002 | Schlager et al. ............ 340/984 |
| 2002/0126010 A1 | 9/2002 | Trimble |
| 2004/0070499 A1 * | 4/2004 | Sawinski ................ 340/568.1 |
| 2004/0103563 A1 * | 6/2004 | Linge .............................. 36/137 |
| 2005/0231361 A1 * | 10/2005 | Godbey ................ 340/539.32 |
| 2006/0226976 A1 * | 10/2006 | Wei et al. ................ 340/539.32 |
| 2006/0267756 A1 * | 11/2006 | Kates ........................... 340/521 |
| 2007/0103296 A1 | 5/2007 | Paessel et al. |
| 2007/0205892 A1 * | 9/2007 | Chen ..................... 340/539.32 |
| 2007/0236347 A1 * | 10/2007 | Francois et al. ......... 340/539.32 |
| 2008/0060730 A1 * | 3/2008 | Young et al. .................. 150/140 |
| 2008/0218343 A1 | 9/2008 | Lee et al. |
| 2009/0295570 A1 * | 12/2009 | Simon et al. ............ 340/539.32 |
| 2010/0066534 A1 * | 3/2010 | Takeichi et al. ............... 340/540 |
| 2010/0231400 A1 * | 9/2010 | Von Mohr et al. ............. 340/665 |

* cited by examiner

SOUND OR RADIATION TRIGGERED LOCATING DEVICE WITH ACTIVITY SENSOR

CLAIM OF PRIORITY UNDER 35 U.S.C. §119

This patent application claims the benefit of U.S. Provisional Patent Application No. 61/153,550, filed Feb. 18, 2009, which is specifically incorporated by reference herein in its entirety.

BACKGROUND OF THE INVENTION

1. Field of the Invention

The present invention is directed towards a locating system for a portable electronic device, and more particularly towards a method and apparatus for temporarily disabling a locating function in response to detecting a predetermined condition.

2. Description of the Related Art

With the proliferation of portable electronic devices, such as mobile telephones, personal digital assistants ("PDAs"), remote controls, and the like, it is not uncommon to lose track of or misplace the various devices. For example, mobile telephones and television remote controls are notorious for falling behind furniture or becoming wedged underneath sofa cushions. Components exist to cause a device to emit a perceptible signal in response to a hand clap, light signal or radio frequency signal that is generated to locate the misplaced device. A common problem with these components, however, is that they are vulnerable to malfunction, such as emitting the locator signal in the absence of a searching signal; that is, generating "false positive" signals. Another common problem is that such components may require a dedicated radio signal transmitter to generate and transmit the searching signal. This second transmitter may itself be vulnerable to being misplaced.

It would be desirable, therefore, to provide a locating system for a portable electronic device that overcomes these and other limitations of prior art systems.

SUMMARY OF THE DISCLOSURE

The present technology may be implemented in a portable electronics device, for example a television remote control, mobile telephone, or keyless entry control device. Characteristically, the portable device includes a housing enclosing a circuit. The circuit may be configured to perform user-requested functions in response to input from a user interface device, such as, for example, a keypad, using a programmable processor. The circuit is further configured to cause the portable electronics device to automatically perform a locating function comprising emitting a locating signal, in response to detecting a predetermined first wireless signal using at least one sensor coupled to the circuit and distinct from the user interface device. For example, the portable device may include a light sensor, microphone, temperature sensor, accelerometer, and/or radio receiver coupled to its control circuit. The circuit is responsive to sensor input from such a sensor to activate the locating function and cause the portable device to emit a locating signal, such as, for example, an audible tone, visible signal, radio homing beacon or tactile response.

The circuit is further responsive to sensor input from such a sensor to automatically disable the locating function in response to determining that the sensor input satisfies a predetermined condition. The sensor input used to trigger disablement of the locating function may come from the same sensor from which the circuit receives input to determine whether or not the device should emit the locating signal. For example, input from an infrared light sensor indicating a first code value (e.g., a binary encoded character string) may be used to trigger a locating signal, but this function may be disabled if the sensor detects a second code value within a defined period (e.g., five seconds) prior to detecting the first code value. In the alternative, or in addition, the sensor input used to trigger disablement may come from a different sensor connected to the circuit. For example, if the locating signal is triggered by input from an infrared sensor, disablement of the locating function may be activated by input from a microphone, or vice-versa.

The circuit may disable the locating function before it causes the portable device to emit a locating signal. When the location function is disabled, the circuit will not permit the portable device to emit a locating signal, regardless of sensor input. After a period of time, or in response to further sensor input, the circuit may re-enable the locating function, thereby enabling the portable device to emit a locating signal in response to predetermined sensor input.

The circuit of the portable electronics device may comprise a processor processing the sensor input using an algorithm to determine when to cause the device to emit a locating signal in response to wireless input, when to disable the locating function so that no locating signal is emitted regardless of wireless input, and when to re-enable the locating function. The circuit may further include a timer, used to determine when to re-enable the locating function. For example, if sensor input indicates that a portable electronic device comprising a keyless entry control device is connected to a key that is inserted in an ignition switch, the circuit may disable a location function that would otherwise be responsive to microphone input until some predetermined period of time after the sensor input indicates that the key is removed from the ignition. This prevents inadvertently triggering the location signal when the portable device is connected to the ignition switch.

The predetermined condition that the circuit tests for to determine whether or not to disable a location function may be characterized in different ways. For example, the condition may be characterized by sensor input having signal strength above a defined threshold, such as when the electronic device is in close proximity to the primary device it controls, such as a television. In that case, the locating function may be disabled. Conversely, the condition may be characterized by sensor input having signal strength below a defined threshold. For example, the locating function may be disabled if the sensor indicates that the ambient environment is abnormally quiet or dark, to prevent generation of inadvertent locating signals. Numerous other conditions may be defined for triggering or disabling a location signal, of which further examples are provided in the detailed description that follows.

DETAILED DISCLOSURE

Figure 1:
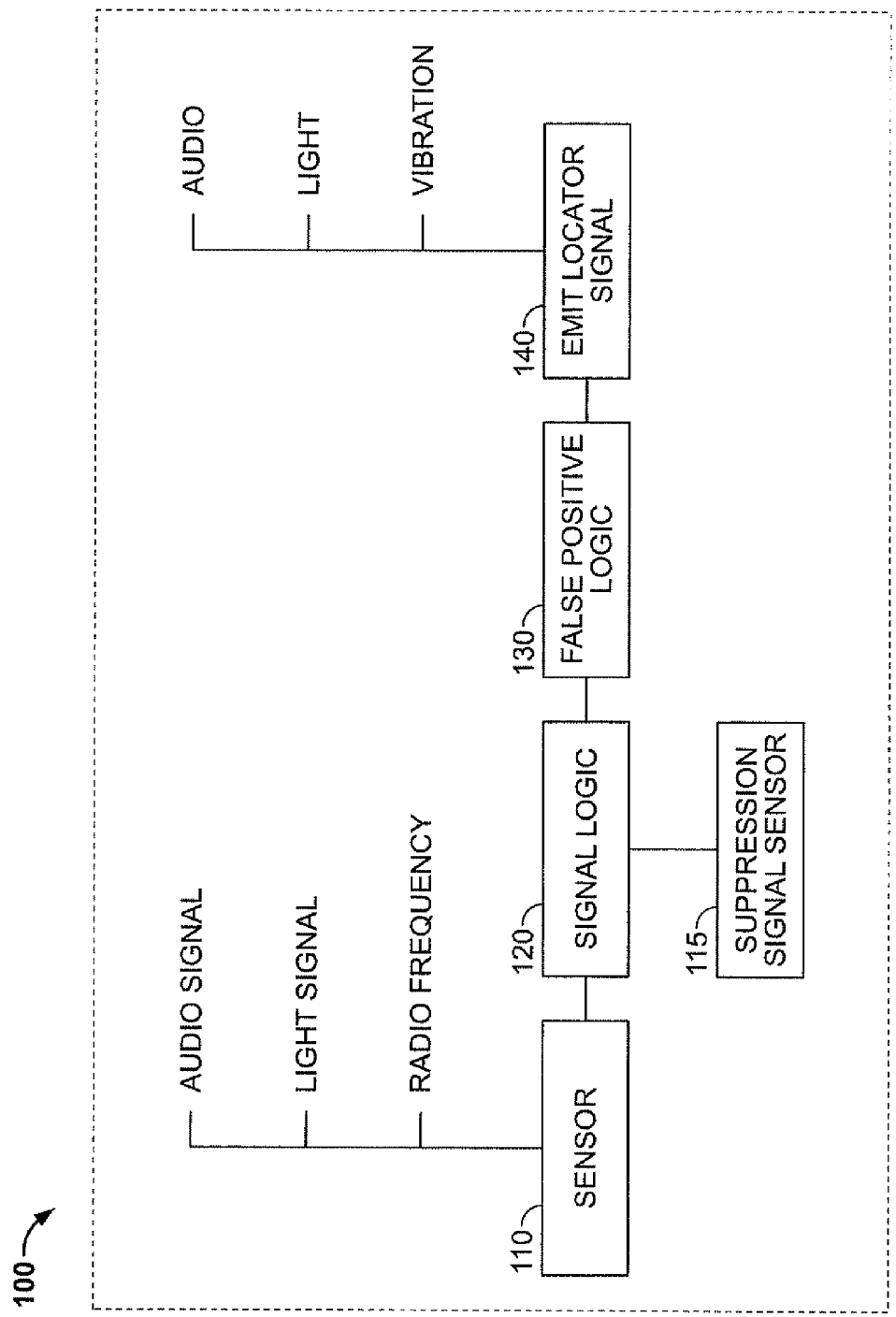
FIG. 1 is a functional block diagram showing components of a device incorporating a sensor-activated locator apparatus incorporated in a portable electronic device.

FIG. 1 is a functional block diagram showing components of a device incorporating a sensor-activated locator apparatus 100 incorporated in a portable electronic device. The sensor-activated locator apparatus 100 comprises a sensor 110 that is coupled to a signal logic module 120. The sensor 110 may receive a searching signal, such as an audio, radio frequency, or light signal, which is emitted in order to locate the device. For example, an audio sensor may be configured to detect particular audio signals, such as several claps in quick succession, or a light signal. Alternatively, a light sensor may be employed to detect a particular light frequency, such as with a diffused laser source or a flashlight with a "black" light bulb. The signal logic 120 determines whether the signal received by the sensor 110 is a searching signal.

The false positive logic module 130 is employed to prevent, or at least reduce the likelihood, of having the device generate a locator signal 140 in the case of false positive signals, i.e., signals which are perceived to be searching signals but, in fact, are not. Thus, the false positive logic 130 may operate to prevent normal ambient signals, such as light or sound signals emitted from, e.g., a television, radio or other source, from triggering the device to emit the locator signal. In other words, the false positive logic module operates to override determinations from the signal logic module 120 under predetermined conditions, thereby temporarily disabling operation of the locating function for the device 100.

In one embodiment, the false positive logic 130 may incorporate a timer. In accordance with this embodiment, a locator signal is not generated for a period of time after a specific event or combination of events. For example, the device may not generate a location signal for a period of five minutes after the device was last used. Thus, any searching signals received by the sensor 110 during this time period would not operate to generate a location signal. The time period may be user set, preset to a default time period, or be set based on adaptive logic in the device, such as user inputs indicating when a false positive has occurred. The false positive logic 130 may increase or decrease this time period based on such user input.

A suppression signal sensor 115 may also be incorporated to receive suppression signals. Suppression signals may include radio frequency signals, light signals, audio signals, motion signals, actuation signals (indicating that the device is in use), and other signals which indicate that the device is not misplaced or lost. The suppression signal may be received via the same sensor 110 or via a different suppression signal sensor 115. Once a suppression signal is received, it may act to disable the sensor 110 or otherwise prevent the sensor 110 or signal logic 120 from receiving or acting upon a searching signal. For example, a television may be configured to send a dedicated suppression signal to the suppression signal sensor 115 such that the remote control should not be able to receive or respond to a searching signal while the television is turned on. Thus, the user would need to turn the television off, thereby stopping the suppression signal, so as to enable the device to act upon a received searching signal. An environmental signal may also take the place of an ambient light, radio or audio signal. For example, the presence of a light signal that refreshes at the same refresh rate as a television being controlled by the remote control would inform the remote control to suppress (or at least reduce the sensitivity to) any response to a search signal.

Similarly, the absence of other environmental sounds, such as voices and/or ambient lights, may indicate a likelihood that the user is asleep, and the sensor 110 may be disabled or rendered less sensitive to the searching signal. A manual suppression button may also be provided on the portable device or on another device controlling the portable device.

The sensitivity of the sensor 110 to a searching signal may be based on the amount of time that has elapsed from a suppressive event. A suppressive event may be any event that indicates that the device is not lost, such as actuation or use of the device. For example, a device is not likely to have been lost one minute after it was last used or actuated and may therefore be less sensitive to the searching signal or require an unambiguous searching signal. In contrast, the greater the time period since the device has last been used or actuated, the more likely the device has been misplaced or lost. Thus, the device sensitivity to the search signal may be enhanced or increased with the increasing passage of time since it was last used or actuated.

In accordance with another embodiment, a motion sensor, such as an accelerometer, may be employed to disable the sensor 110 or suppress the generation of a locator signal while the device is in motion. Alternatively, the motion sensor may act to disable or suppress the location signal for a set period of time after the device is first put in motion, even if still in motion at the end of that period, or for a set period of time after the device ceases being in motion.

In yet another embodiment, a proximity sensor may also be provided. The proximity sensor may be coupled to the sensor 110, signal logic 120, false positive logic 130, or locator circuitry 140. In one aspect, the proximity sensor may deactivate or change the sensitivity of the sensor 110 based on whether the proximity sensor detects another device, such as an RFID tag, a magnetic field, an electric field, or other. For example, an iPod® or similar device connected to a computer may have its locator circuitry 140 disabled because an iPod® or any similar device is not likely to be misplaced when it is connected to a computer. Similarly, two location devices within inches of each other may be configured to detect one another and cause one of the devices, i.e., the one with the higher serial number, to become disabled. In another aspect, two different searching signals may be detectable by the signal logic, one signal triggering the signal logic when it is proximate to a specified device, and the other triggering it when the device is not proximate to the specified device. Thus, for example, a television remote control may be more easily triggered to emit a locator signal in response to a received searching signal when it is out of proximity to the television it controls, as the remote control will presumably have been misplaced.

In a further embodiment, a heat sensor may also be provided on the device. The heat sensor may deactivate (or activate) the sensor 110 when heat is detected. Such is the case when, for example, the device is in the user's hand or resting on the user's chest.

In embodiments where the device controls another device, such as a remote control and a television, communication between the remote control location sensor and the television may permit the remote control device and the television it controls to together suppress the generation of false positive locator signals from being emitted. For example, when the television detects that it is being asked to flash three times by the DVD it is playing, the television may send an additional signal to the remote control indicating that this is not, in fact, a searching signal In yet a further embodiment, the searching signal may be provided by the device being remotely controlled or otherwise actuated by the device whose location is being tracked, as in the case of the remote control actuating a television or car keys actuating a car. Thus, for example, the car keys may include a sensor actuated by a receiving radio signal from the car or by detecting a unique signal within the car's horn.

The foregoing functions and activities of the locating system in the portable electronic device may be implemented using programmable logic, compiled and stored in a non-volatile memory (not shown) of the portable electronic device 100 as encoded instructions. During operation, the encoded instructions are loaded into a processor of the portable electronic device, causing operation of device in accordance with the foregoing description. The various illustrative logical blocks, modules, and circuits described in connection with the embodiments disclosed herein may be implemented or performed with a general purpose processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine.

Figure 2:
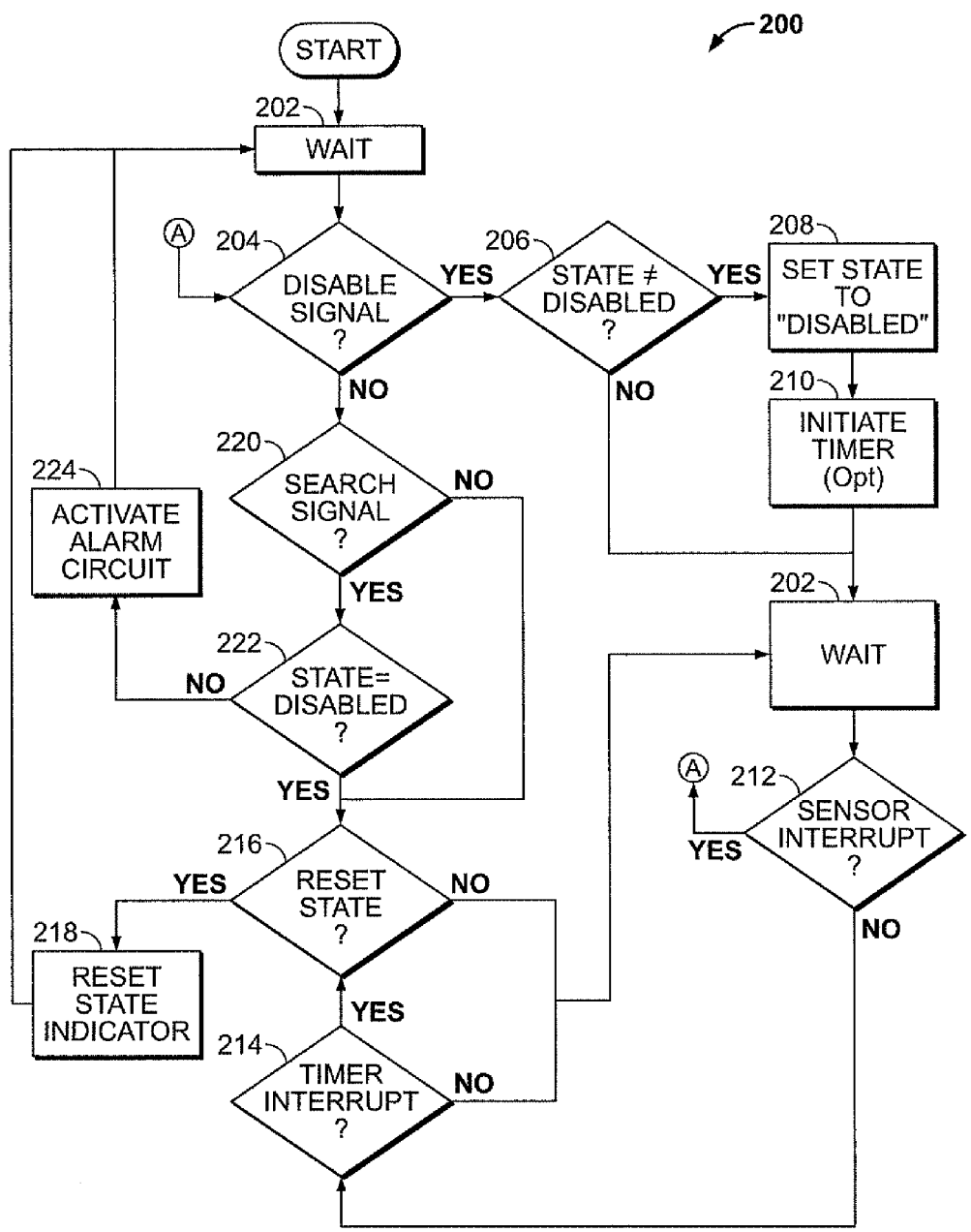
FIG. 2 is a flow chart exemplifying steps of a method for controlling a locating function in a portable electronic device.

Accordingly, the device 100 may perform a method 200 including steps as exemplified in FIG. 2. Method 200 automatically disables a locating function in a portable electronic device using inputs from a sensor to drive disablement logic in a processor of the portable electronic device connected to the sensor. The disablement logic may comprise an algorithm for determining when sensor input indicates that the locating function should be disabled. Among other things, the method may include activating the locating function to emit a locating signal from the portable electronic device, in response to input from a search signal sensor generated at a time when the locating function is not disabled, and automatically re-activating the locating function after a period of time has elapsed since automatically disabling the locating function, in response to a timer.

The portable electronic device may be programmed to enter a wait state 202 after powering up and initializing, and when not performing some other function. The wait state 202 may be an untimed state, meaning that it continues indefinitely until input is received that causes the device to perform some other function, or the device is powered off. When in the wait state, the device can receive input from one or more sensors that may cause the wait state to be interrupted. A timer may also interrupt the wait state. User input, for example keypad input, can interrupt the wait state to cause the device to perform its intended primary function, for example, controlling a television, placing a phone call, unlocking a vehicle, or other function as known in the art.

Decision process 204 may be triggered by a sensor-responsive interrupt of the wait state 202. Output from a sensor module is passed to a by the device's circuit to a processor for signal processing. For example, sensor input may be converted to digital form by an analog-to-digital conversion module and the digital sensor data placed in short-term device memory. The processor analyzes the digital data to determine whether or not 204 the signal data meets predetermined criteria for a signal indicating that the location function of the device should be temporarily disabled; for short, a "disable signal." For example, the processor may compare the incoming data signal to a stored data pattern for detecting disable signals, and decide that that the incoming signal is a disable signal if congruency between the stored test pattern and the incoming signal exceeds a defined threshold; e.g., 95% congruent.

The device operating program may include a state variable, for example, a binary flag, used to indicate whether the locating signal is disabled or not at any given time. For example, the flag may be initialized to "0" indicating that the signal is "not disabled" (i.e., "enabled") when the device is powered up or otherwise reset. If the processor determines that a disable signal has been received 204, it may in response check the current value of this state variable 206. If the current state is not equal to disabled 206, (meaning that the state is enabled, assuming the state variable is binary), then the processor may set the state variable to indicate that the device is in a disabled state 208, for example by changing the binary value from "0" to "1." Conversely, if the current value of the state variable indicates that the device's locating function is already disabled, then the processor may branch to the interruptible wait state 202.

After setting the state variable to "disabled" at 208, the processor may optionally initiate a timer 210 for measuring the period of time that the wait state continues. When the timer reaches a predetermined value, the processor may terminate the wait state 214 and reset the state variable to "not disabled" 218 before resuming the wait process 202. A timer and timer interrupt may be used when it is desired to terminate the disabled state a defined period after receiving a disable signal. For example, where user input indicative of user activity also functions as triggering a locating signal disabled state, if some defined period of time (e.g., 1 minute or 10 minutes) elapses with no user activity, it may be desirable to terminate the disabled state and enable the device's locating function.

In the alternative, or in addition, it may be desirable to terminate the disabled state regardless of any timer value. Accordingly, sensor input may be used to interrupt the wait state 212, in response to which the processor may branch to the signal testing process 204 as previously described. One possible result of the process 204 is branching to the flow path described above starting at 206, conditioned on the processor detecting a disable signal. Another possible result, conditioned on the processor not detecting a disable signal after a sensor interrupt, is branching to a second signal testing process 220.

In testing process 220, the processor determines using digital pattern matching or some other method, whether or not the received sensor input constitutes a search signal, i.e., a signal for triggering the device's locating function. If the processor detects a search signal, it may check for disablement of the locating function 222, for example by testing the value of a state variable. If the processor determines that the locating function is not disabled 222, it may activate the device's locating function 224, for example, causing the device to emit an alarm, before resuming the wait process 222.

Conversely, if the processor determines that locating function is disabled 222, or if the processor determines that the sensor input does not constitute a search signal, the processor may execute a state determination process 216. In state determination 216, the processor may analyze the sensor input, for example using a pattern matching algorithm to compare the input to a stored pattern, to determine whether or not the input meets a defined condition for terminating a disabled state. In the alternative, or in addition, the processor may check the value of a timer variable or other device condition. If the processor determines in response to one of the foregoing inputs that a disabled state should be reset, it may proceed to reset the defined state indicator at 218 before waiting at 202. If the state is not to be reset, the processor may proceed directly to the wait process 202.

Method 200 may be adapted to perform the various specific functions and obtain outcomes as described herein. Other programmable methods may similarly be capable of performing the described functions, and the present technology is not limited to the specific steps and sequence illustrated by method 200, which is merely an example of a suitable method.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Having thus described illustrative embodiments of a system and method for managing a locating function of a personal locating device, an enabling disclosure has been made of subject matter defined by the appended claims.

What is claimed is:

1. A portable electronic device, comprising:
   a housing enclosing a circuit that is configured to perform user-requested functions in response to input from a user interface device,
   the circuit further configured to cause the portable electronic device to automatically perform a locating function comprising emitting a locating signal, in response to detecting a predetermined first wireless signal using at least one sensor coupled to the circuit and distinct from the user interface device,
   wherein the circuit is further responsive to sensor input from the at least one sensor to automatically control a level of sensitivity of, but not disable, the circuit to the first wireless signal in response to determining that the sensor input satisfies a predetermined threshold condition before the device emits the locating signal,
   wherein the at least one sensor comprises a first sensor and a different second sensor connected to the circuit,
   wherein the first sensor is configured to detect the first wireless signal and the second sensor is configured to provide the sensor input in response to a signal distinct from the first wireless signal,
   wherein the circuit operates to prevent normal ambient signals from triggering the portable electronic device to perform the locating function, and
   wherein the circuit decreases the level of sensitivity based on the second sensor sensing an absence of at least one of ambient noise or light.

2. The portable electronic device of claim 1, wherein the first sensor and the second sensor comprise different sensors from the group consisting of a temperature sensor, a microphone, a visible light sensor, and an infrared light sensor.

3. The portable electronic device of claim 1, wherein the circuit further comprises a processor processing the sensor input using an algorithm to determine when the locating function is disabled.

4. The portable electronic device of claim 1, wherein, in response to disabling the locating function, the circuit reactivates the locating function after a predetermined time.

5. The portable electronic device of claim 1, wherein the predetermined condition is characterized by sensor input having signal strength above a defined threshold.

6. A system for controlling activity of a locating function in a portable electronic device, comprising:
   a sensor-activated locator apparatus;
   a signal logic module coupled to the sensor-activated locator apparatus, the signal logic module determining whether to activate emission of a locating signal from a searching signal sensor of the portable electronic device, in response to input from a suppression signal sensor, wherein a level of sensitivity of the signal logic module is controlled but not disabled based on the input satisfying a predetermined threshold condition and the signal logic module decreases the level of sensitivity based on the suppression signal sensor sensing an absence of at least one of ambient noise or light, wherein the searching signal sensor and the suppression signal sensor comprise different types of sensors sensing different input, and wherein the signal logic module processes input from the suppression signal sensor independently of input from the search signal sensor, in determining whether to activate emission of the locating signal; and
   a false-positive logic module coupled to the sensor-activated locator apparatus, the false-positive logic module operating to override determinations from the signal logic module and prevent normal ambient signals from activating emission of the locating signal before emission of the locating signal.

7. The system of claim 6, wherein the portable electronic device further comprises a timer coupled to the signal logic module, wherein the signal logic module uses input from the timer in determining whether to activate emission of the locating signal.

8. The system of claim 7, wherein the signal logic module disables emission of the locating signal for a predetermined period after detecting a suppression signal from the suppression signal sensor.

9. The system of claim 6, wherein the signal logic module processes input from the searching signal sensor using the false-positive logic module in determining whether to activate emission of the locating signal.

10. The system of claim 6, wherein the portable electronic device is a wireless remote control device generating control signals for a second electronic device, in response to user input.

11. The system of claim 10, wherein the searching signal sensor is configured to provide the input to the signal logic module, in response to a signal transmitted from the second electronic device.

12. The system of claim 10, wherein the signal logic module suppresses emission of the locating signal, in response to a predetermined suppression signal received from the suppression signal sensor.

* * * * *